UNITED STATES PATENT OFFICE.

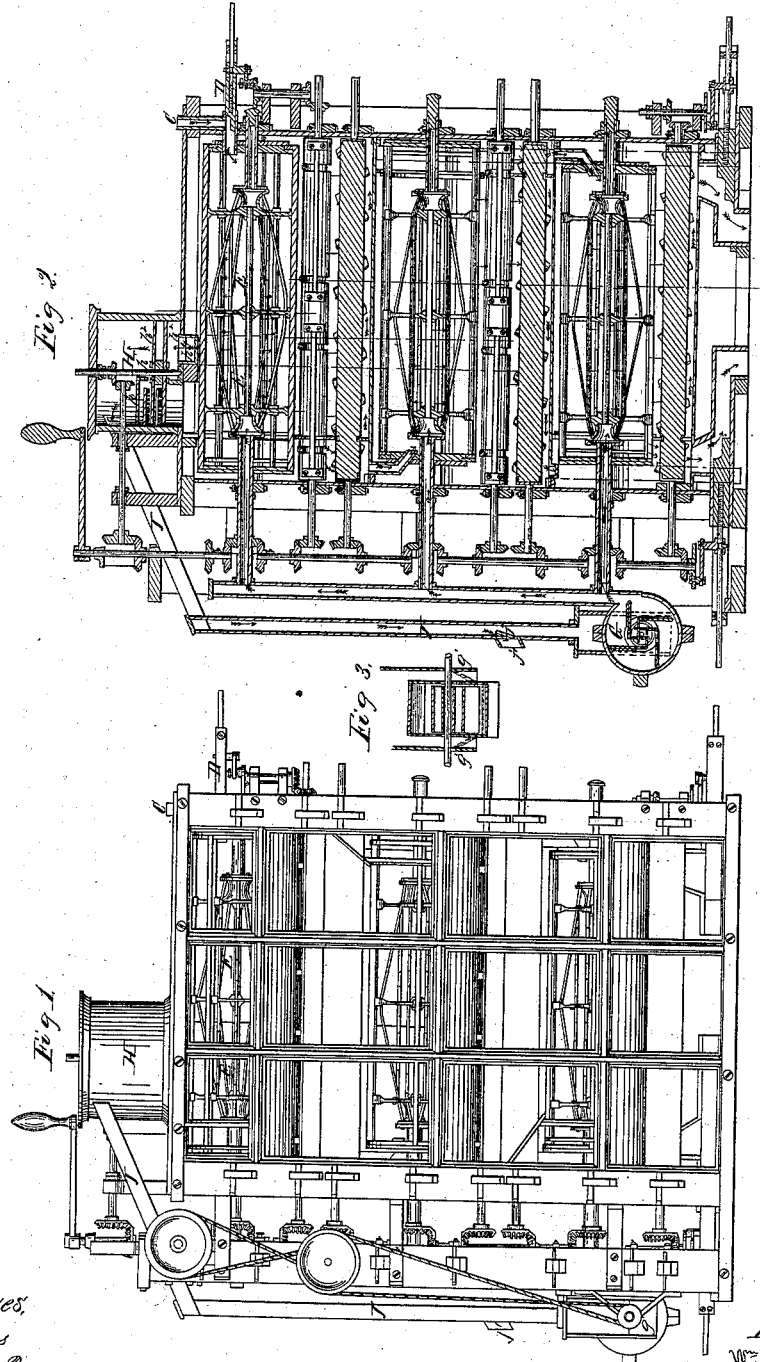

WILLIAM F. COCHRANE, OF SPRINGFIELD, OHIO, ASSIGNOR TO HIMSELF AND WARDER & CHILD, OF SAME PLACE.

IMPROVEMENT IN BOLTING FLOUR.

Specification forming part of Letters Patent No. 37,318, dated January 6, 1863.

*To all whom it may concern:*

Be it known that I, WILLIAM F. COCHRANE, of Springfield, in the county of Clark and State of Ohio, have invented certain new and useful Improvements in Bolting-Chests for Flouring-Mills, (Case B,) of which the following is a full, clear, and exact description, reference being had to the accompanying drawings, which make part of this specification, and in which—

Figure 1 represents a view in elevation of a bolting-chest embracing my improvements, the panels which inclose the chest being removed to show the mechanism; Fig. 2, a vertical longitudinal section; through the same, the mechanism being shown partly in elevation and partly in section; and Fig. 3, a vertical transverse section through the fan-case.

The mode of bolting flour ordinarily used in mills as heretofore constructed is attended by various difficulties. The meal, when first ground, is always hot and often damp, the heat being caused by the friction of the stones, and the dampness by the moisture absorbed by the grain previous to the grinding. The bolting-cloth generally used is made of threads of silk covered with gum, in order to form a smooth, polished surface, so that the flour will pass freely through the fine meshes of the cloth. The dampness and heat of the meal have a tendency to soften and dissolve this gum and make, instead of a polished surface to the thread, a sticky one, to which the particles of flour adhere, and thus close and clog the meshes of the cloth, and also to cause the thread to swell, consequently decreasing the size of the pores. Without ventilation the air confined in the bolting-chest soon becomes heated and surcharged with moisture, which condenses upon the sides of the chest exposed to the influence of the outer atmosphere, thus causing the flour to "dough" or clog the chest and spouts. It is, moreover, found, in practice, that flour bolts more regularly and in a better manner when the air inside the chest is kept at a certain uniform temperature, which should be sometimes below and at others above that of the external atmosphere.

My invention has reference to that class of bolting-chests in which atmospheric pressure is employed to facilitate the process of bolting; and the improvements claimed under this patent consist, first, in returning the air which has passed through the bolting-chest back to the fan and through the reels, whereby the doughing or clogging of the reels, conveyers, or spouts is prevented, and the temperature of the atmosphere in the bolts may be regulated; secondly, in regulating the quantity of air returned to the fan by means of a valve in the return-spout, whereby the temperature of the bolting-chest may be regulated in order to adapt it to the varying circumstances under which it is required to operate; thirdly, in controlling the strength of the blast by a valve in the pipe through which fresh air is admitted to the fan, whereby I am also enabled to regulate the relative proportions of warm and cold air thrown into the chest.

In the accompanying drawings, which represent a convenient arrangement of parts for carrying out the objects of my invention, my improvements are shown as applied to a bolting-chest consisting of three reels, arranged one above the other.

It is deemed unnecessary here to describe in detail the construction and arrangement of the various parts of the mechanism, as the invention claimed under this patent is not limited to such details, and as they are, moreover, fully described in sundry other applications for Letters Patent filed simultaneously with this, and marked, respectively, "A," "C," and "D." I shall, therefore, confine myself to the description of such parts as are necessary to explain the improvements herein claimed.

The collecting-chamber H is shown, in this instance, as being cylindrical in form and closed at top, but open at bottom. A portion of its area is also covered by a partition, $h$. Two parallel horizontal screens are secured upon a vertical rotating shaft, $h'$, driven by suitable gearing. A series of brushes, $h^3$, is secured upon the inner side of the periphery of the cylinder, and project horizontally therefrom in contact with the revolving screens $h^2$. The chamber H communicates directly with the upper reel, E, through its open bottom, while the blast-air escapes from the other reels into the chamber through suitable pipes, $h^4$. A pipe, J, leads from the chamber to the fan G. This pipe is provided with a cast-off valve, $j$, so arranged that in one position the air is forced to return to the fan, while in the other the ingress to the fan is cut off, and the blast-air escapes through the opening $j'$ in the pipe. The fresh air enters the fan through an opening on each side of the fan-case. The size of this aperture is regulated by a valve, $g'$, Fig. 3, like the cast-off valve $j$. The functions of this valve are very important, as it serves not only to regulate the quantity of fresh air admitted to the reels, but also the force of the blast.

The operation of the machine is as follows: The meal passes through the spout C into the pump D, which injects it into the reel E by, which it is bolted. The bolting is assisted by a strong blast from the fan G. The manner in which the blast enters the reels is clearly shown in Fig. 2. After passing through them the blast-air enters the collecting-chamber H, carrying a portion of fine flour with it in the form of dust. The air escapes through the screws $h^2$, (leaving the fine flour upon them to be returned to the bolting-chamber,) into the trunk or pipe J, and may either be returned to the fan and through the reels by closing the opening $j'$ by means of the valve $j$, or be allowed to escape directly into the open air by opening that valve, which is so arranged as to close the air-pipe at the same time. This capability of returning or not returning the air to the reels again is one of great importance, for under certain conditions of atmosphere, (such as warm, damp weather,) if the air be returned to the bolts, it would cause the reels to dough, and sometimes even clog the conveyer, as I have found by experience. The air during its passage through the chest takes up the heat from the meal which it has acquired by being ground, so that warm air may be returned to the fan when the external air is too cold. The quantity of external air admitted to the bolts is regulated by opening or closing the valves $g'$, one of which is on each side of the fan, by which means it will be seen that I have the blast perfectly under control.

In the drawings, the red arrows indicate the course taken by the flour in its passage through the chest, the blue arrows the direction of the currents of air, and the black ones the course of the offal.

I have described my improvements as applied to a chest consisting of three reels arranged one above the other; but it is obvious that a greater or less number might be employed, and that the details of my arrangement might be varied to some extent without departing from the spirit of my invention. Such modifications would readily occur to a skillful millwright after reading my specification.

What I claim under this patent as my invention is—

1. Returning the blast-air to the fan, substantially in the manner and for the purposes described.

2. Regulating the quantity of warm air returned to the fan by means of a cast-off valve in the return air-trunk, for the purposes set forth.

3. Controlling the strength of the blast by means of valves in the air-pipes, substantially the in manner and for the purpose described.

In testimony whereof I have hereunto subscribed my name.

WILLIAM F. COCHRANE.

Witnesses:
S. A. BOWMAN,
WARDER CUMMING.